United States Patent Office 3,392,751
Patented July 16, 1968

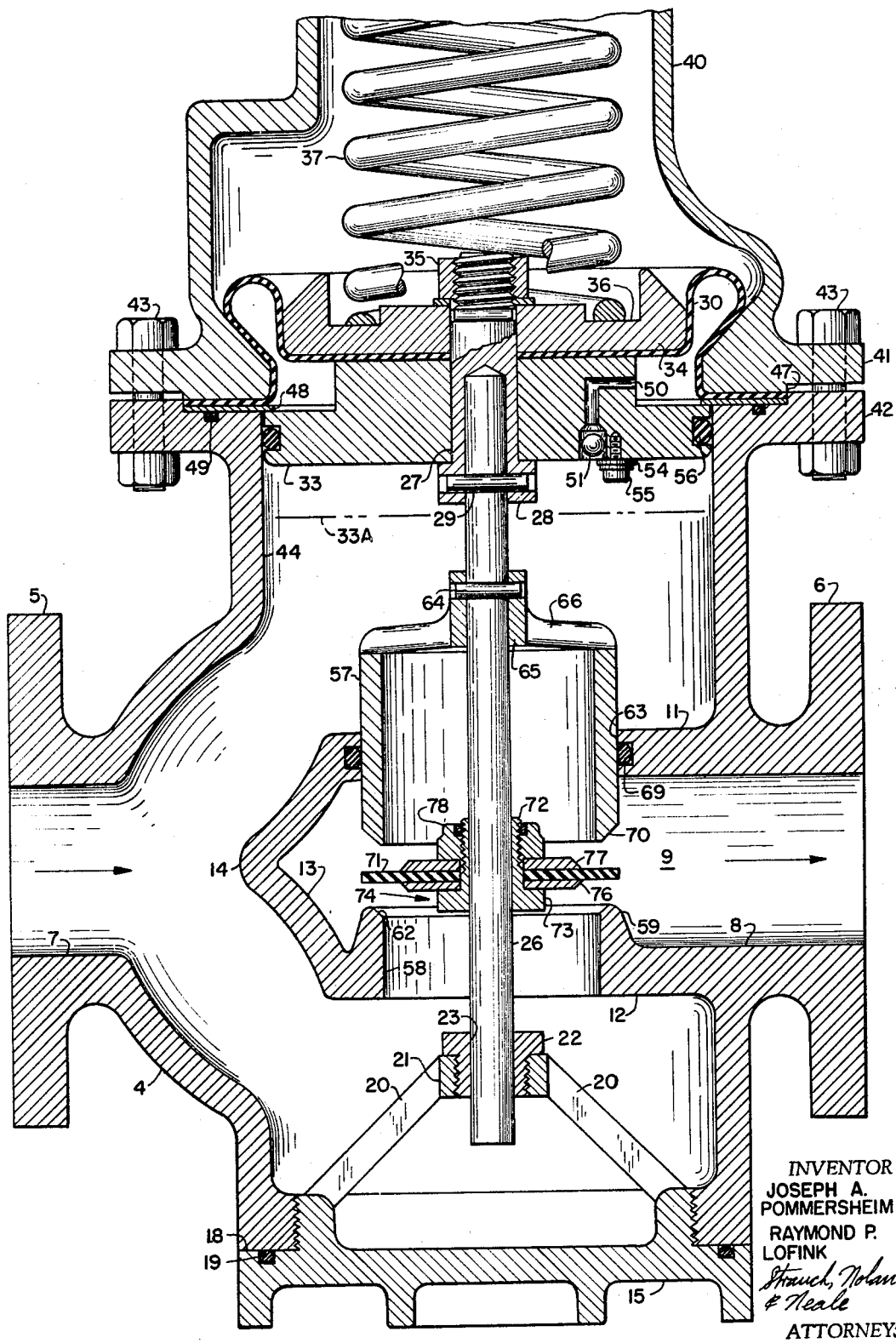

3,392,751
PRESSURE CONTROL VALVE
Joseph A. Pommersheim and Raymond P. Lofink, Du Bois, Pa., assignors to Rockwell Manufacturing Company, Pittsburgh, Pa., a corporation of Pennsylvania
Filed Mar. 16, 1965, Ser. No. 440,227
13 Claims. (Cl. 137—494)

ABSTRACT OF THE DISCLOSURE

A pressure responsive fluid control valve having a valve member connected to a valve stem and cooperating with an internal valve seat to control the flow of fluid through the body of the valve. The position of the valve member to the valve seat is controlled by application of line fluid pressure to a diaphragm which is connected to the valve stem. Coacting stop means comprising a piston element connected to the valve stem and an annular plate clamped in the valve body prevents over travel of the diaphragm. A floating resilient sealing gasket is mounted between the valve member and the valve seat and is clamped between the valve member and the seat when the valve is closed.

---

This invention relates to improvements in pressure responsive valves operable to control fluid pressure or flow in response to the pressure of the fluid itself.

More particularly, the invention relates to improvements in such valves having movable plates that are positioned by flexible diaphragms responsive to the action of fluid pressure in one direction and means such as a spring in the other direction to control the position of a valve element which is effective to control fluid flows or pressures in response to movements of such pistons.

United States Patent No. 3,115,068, issued Dec. 24, 1963, to R. P. Lofink for "Valve Operating Mechanism," illustrates one form of valve control to which certain aspects of the instant invention are applicable. The valve actuating mechanism there disclosed is a spring loaded compound fluid motor comprising a normally operative diaphragm motor and a normally inoperative piston motor interconnected for unitary movement with the diaphragm motor and adapted for automatic operation in the event of failure or overload of the diaphragm motor. In that patent, a flexible diaphragm to which a plate or piston is attached is subjected to fluid pressure from the downstream side of the value and, if the downstream pressure becomes excessive, the diaphragm raises the plate or piston and moves the valve toward its closed position. In the event the diaphragm should rupture or the applied pressure becomes excessive, a check valve in a passageway between the underside of the piston and the space between the piston and the diaphragm closes so that the piston becomes effective to position the flow control valve automatically. The plate is thus in effect a stand-by piston as it acts as a piston only when the diaphragm has ruptured or the pressure becomes suddenly excessive. In the structure shown in that patent, the limits of travel of the stand-by piston and diaphragm are determined by the engagement of the flow control valve against its seat and against the valve body. There are no limit stops independent of the valve which prevent overtravel of the diaphragm and piston in either direction. Although it is desirable to apply this improved form of valve actuating mechanism to double ported balanced valves of the type shown in United States Patent No. 2,921,603, issued Jan. 19, 1962, to R. P. Lofink for "Double Ported Poppet Valve" to form a balanced valve pressure regulator or pressure relief valve, it has not been feasible to do so heretofore because in such valves the upward movement of the valve stem and the diaphragm is not limited by engagement of the valve with its seat so that the diaphragm may be damaged by excess upward travel. This invention eliminates this problem by providing a structure whereby damage to the diaphragm by movement beyond its designed limits is prevented by providing a positive diaphragm stop independent of the closing or opening of the valve which it controls. While positive diaphragm stops are not basically new as is illustrated by United States Patent No. 2,707,966, issued May 10, 1955, to J. F. Taplin for "Pressure Regulator Valve," the diaphragm stop constructions as heretofore developed are inapplicable to compound motor actuators of the type disclosed in the aforesaid Patent No. 3,115,068 since they would interfere with the normal functioning of the diaphragm or unduly complicate and increase the cost of the mechanism involved. The present invention provides a positive stop for the movable element of a compound diaphragm and piston type spring loaded valve actuator which precludes damage to the mechanism resulting from excess pressures without interfering with the normal functioning of the movable element of the compound motor.

The invention also provides a novel movable or floating resilient sealing gasket between a valve and its seat whereby an effective leak-proof seal is accomplished that is not susceptible to damage by mishandling, and which is inexpensive. While the floating seal is shown as being applied to a valve of the type shown in the aforesaid Patent 2,921,603 to Lofink, it will be apparent that it is equally applicable to valves of other types. A seal of this type is particularly desirable in relief valve applications, where a completely tight shutoff is required.

It is accordingly a primary object of the invention to provide a novel pressure control valve.

Other major objects of the invention are to provide a pressure responsive diaphragm controlled valve having:

(a) Novel means to prevent damage to the diaphragm by movement beyond its designed limits, (b) A novel combination of stand-by-piston and diaphragm movement limiting means, (c) A novel floating seal between movable and fixed elements of the fluid control valve, and (d) A stand-by piston and a fluid control valve having a floating seal between its fixed and movable elements.

These and other objects of this invention will become more fully apparent by reference to the appended claims and as the description proceeds in connection with the accompanying scale drawing, wherein:

The figure is a vertical section through a regulating valve embodying the invention.

A valve body 4 has integral flanges 5 and 6 for connection to fluid inlet and outlet fittings respectively and having passageways 7 and 8, the outlet passageway 8 terminating in a central chamber 9 having an upper wall 11 and a spaced lower wall 12 connected by peripheral wall 13 having an annular nose 14 which divides the incoming fluid into one portion directed above the upper wall 11 and another portion directed below the lower wall 12. The bottom of the valve body 4 has a circular opening that receives a threaded bottom cap 15 having an annular flange that abuts against a mating flange 18 on the body 4 and which has an annular recess for receiving a sealing gasket 19 which may be in the form of an O-ring.

A spider having two diametrically opposed legs 20 may be integral with the bottom cap 15. The upper ends of the legs 20 terminate in a collar 21 which is internally threaded to receive a bushing 22 that has a central bore 23 to provide a guide for the lower end of a valve stem 26.

The upper end of the valve stem 26 is received in a bore in a diaphragm stem 27 having an enlarged collar 28, and a pin 29 passes through the collar and the valve stem 26 to secure the valve stem to the diaphragm stem. A flexible diaphragm 30 has its central portion clamped between the upper surface of a circular plate or stand-by piston 33 and a circular diaphragm plate 34, the plates 33 and 34 being clamped together by a nut 35 which is threaded on the upper protruding end of the diaphragm stem 27. The upper surface of the diaphragm plate 34 has an annular recess 36 forming a seat for the lower end of a coiled compression spring 37.

A housing 40 encloses the spring 37 and has a flange 41 on its lower end by which it is secured to a flange 42 on the top of the valve body 4 by a series of bolts 43. The upper portion of the valve body has a cylindrical bore 44 within which the circular plate 33 is reciprocable, and the flange 42 has a circular planar recess which mates with a corresponding projection 47 on the bottom of flange 41. Seated within the recess is a rigid annular piston stop ring 48 having an internal diameter smaller than the outer diameter of the plate or stand-by piston 33. An O-ring sealing gasket 49 is seated in a groove in the flange 42 beneath the stop ring 48.

The outer periphery of the flexible diaphragm 30 rests on top of the stop ring 48, and the diaphragm periphery and the stop ring are clamped in a fluid tight manner between the recess in the top of the flange 42 and the projection 47 on the bottom of flange 41 when the bolts 43 are tightened. Pressure of the fluid within the valve body 4 is transmitted to the underside of the diaphragm 30 through a passageway 50 in the stand-by piston 33, which passageway has a ball 51 that acts as a check valve upon a sudden surge of pressure or rupture of the diaphragm 30, all as described in the aforesaid Patent 3,115,068 to Lofink. The ball is prevented from falling out of the passageway 50 by a washer 54 partially covering the entrance to the passageway and held in place by a screw 55. An O-ring 56 radially compressed within an annular recess in the periphery of the plate 33 engages the cylindrical surface of bore 44 and serves to prevent fluid leakage between the periphery of plate 33 and the bore 44 when the plate is serving as a stand-by piston.

In the illustrated embodiment, the diaphragm 30 is of the type shown in Lofink Patents 2,950,739 and 3,115,068 wherein the effective area of the diaphragm increases as the plate 33 moves upwardly. As illustrated in the drawing of this application, the plate 33, the stem 27 and the valve stem 26 are all at the upper ends of their stroke, further vertical movement being prevented by engagement of plate 33 with the underside of the rigid stop ring 48. In this position, the control valve tube 57 (not yet described), is in its fully open position but, if it were not for the stop ring 48, it could rise further. The compression of the diaphragm loading spring 37 is adjustable by conventional means such as shown in the aforesaid Lofink Patents 2,950,739 and 3,115,068.

The lower wall 12 of the central chamber 9 in the valve body has a cylindrical bore 58 therethrough forming a port and which is surrounded by a raised annulus 59 having a conical valve seat 62. The cylindrical control valve tube 57 is movable vertically through a mating bore 63 in the upper wall 11, being connected to the valve stem 26 by a pin 64 passing through a boss 65 integral with a three legged spider 66 fixed to the top of or integral with the control valve tube 57. Bores 58 and 63, stem 26, and conical seat 62 are coaxial. Bore 63 for the tube 57 has an annular groove intermediate its ends within which is seated an O-ring gasket 69 for leak tight sliding engagement with the outer cylindrical surface of the valve tube 57. The lower end of the tube 57 is conically beveled at 70 for mating engagement with the conical valve seat 62 in the event that the floating resilient sealing gasket 71, now to be described, is not used.

Gasket 71 is of resilient non-porous material such as rubber or the like that will not deteriorate under the influence of the fluid passing through the valve. A BUNA-N synthetic rubber having a hardness of 80 durometer has been found to be suitable. The gasket 71 is in the form of a disc having an outer diameter large enough to overlie the raised annulus 59 surrounding the bore 58. It has a central hole through which passes the threaded hollow stem 72 of a metallic or hard plastic bushing indicated generally at 74 and having an enlarged head 73. Gasket 71 is mounted between rigid washers 76 and 77 which fit over the threaded stem 72 and are firmly clamped against the head 73 by a nut 78. The outer diameters of the washers 76 and 77 are smaller than the diameter of the bore 58 centrally of the fixed valve seat 62, and the central bore through the bushing 74 allows free axial sliding movement of the assembly of the bushing and the sealing gasket 71 up and down the valve stem 26.

In operation, when the control valve 57 is closed, the bottom surface of the circular plate or stand-by piston 33 is in the position indicated in the dot-dash line at 33A and the bottom edge of the control valve tube 57 is pressing the floating sealing gasket 71 against the top of the raised annulus 59 and the upper edge of the conical valve seat 62 thereby establishing a fluid tight seal between disc or gasket 71 and tube 57 and between disc or gasket 71 and annulus 59 and isolating inlet 7 from outlet 8. This condition will be maintained as long as the pressure within the valve body 4, acting against the underside of the flexible diaphragm 30, is insufficient to raise the plate or stand-by piston 33 against the force of the spring 37 which is resiliently biasing the control valve tube 57 into its lowermost or closed position. Even though there is fluid pressure within the valve body 4, fluid cannot flow into the central chamber 9 either through the bore 58 in the bottom wall 12 thereof or through the bore in the control valve tube 57.

If the fluid pressure within the valve body increases to a sufficient value, it will raise the plate 33 because of the total force of the pressure applied to the plate 33 and the underside of the diaphragm 30. This will raise the control valve tube 57 and fluid can flow downwardly through tube 57 and upwardly through bore 58 into the central chamber 9 to the outlet passageway 8. The sealing gasket 71 will float in the space between the upper end of annulus 59 and the lower end of control valve tube 57, its weight being overcome by the pressure of the fluid moving upwardly through bore 58.

The floating resilient sealing gasket 71 is particularly useful in relief valve applications where the illustrated valve is used to relieve overpressure in a fluid line or container, because in such case a completely tight shut-off is required when excess pressure is not being vented, it being difficult to attain and maintain such a shutoff where a metal to metal engagement of seat and valve occurs. The floating sealing gasket is not as subject to damage from mishandling or dislocation and the like as would be a fixed insert or coating of resilient material on one or both of the valve seats 62 and 70.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A pressure controlled balanced valve comprising a pair of coaxial relatively axially movable valve seats, means defining a chamber enveloping said seats and the space therebetween, an inlet, means exterior to said chamber connecting said inlet in fluid communication with each of said seats, and an elastomeric disc mounted coaxial with and for axial floating motion between said seats within said chamber, and means for relatively axially moving said seats between a closed position in which said disc is compressed between said seats to preclude fluid flow from said inlet into said chamber through said seats while being subjected to inlet pressure on both sides and an open position in which said disc is disposed in floating axially spaced relation between said seats to permit fluid flow from said inlet through each of said seats into said chamber while said disc remains subjected to equal pressures, said last named means comprising a pressure responsive valve actuating mechanism having a spring loaded compound fluid motor comprising a normally operative diaphragm motor and a normally inoperative piston motor interconnected for unitary movement with the diaphragm motor and adapted for automatic operation in the event of failure or overload of said diaphragm motor and positive stop means for limiting travel of the movable portions of said motors to the operative range of movement of said piston motor.

2. A pressure controlled balanced valve comprising a valve body defining an inner chamber, an outer chamber substantially enveloping said inner chamber, an inlet opening into one of said chambers, an outlet opening into the other of said chambers, means defining a pair of substantially equal diameter coaxial conduits through opposed walls of said inner chamber, one of said conduit defining means being fixed and the other mounted for axial movement toward and from the fixed one of said conduit defining means, an elastomeric disc having a cross section greater than the internal cross section of said conduits and mounted for coaxial floating movement between the adjacent ends of said conduits, and means operable to move said movable conduit defining means toward said fixed conduit defining means to compress said disc between the adjacent ends of said conduit defining means and thereby preclude fluid flow between said chambers and for movement away from said fixed conduit defining means to permit fluid flow between said chambers through both of said conduit defining means, said disc being subjected to substantially equal fluid pressures on both sides in both its open and closed positions, said last named means comprising a pressure responsive valve actuating mechanism having a compound fluid motor embodying a normally operative diaphragm motor and a normally inoperative piston motor interconnected for unitary movement with the diaphragm motor and adapted for automatic operation in the event of failure or overload of said diaphragm motor and positive stop means for limiting travel of the movable portions of said motors to the operative range of movement of said piston motor.

3. The combination defined in claim 2 wherein said positive stop means comprises a rigid fixed annular projection interposed between the diaphragm of said diaphragm motor and the piston of said piston motor and engageable by said piston to arrest axial movement of said piston motor toward said diaphragm.

4. A balanced valve comprising a pair of coaxial relatively axially movable valve seats, means defining a chamber enveloping said seats and the space therebetween, an inlet, means exterior to said chamber connecting said inlet in fluid communication with each of said seats, and an elastomeric disc mounted coaxial with and for axial floating motion between said seats within said chamber, and means for relatively axially moving said seats between a closed position in which said disc is compressed between said seats to preclude fluid flow from said inlet into said chamber through said seats while being subjected to inlet pressure on both sides and an open position in which said disc is disposed in floating axially spaced relation between said seats to permit fluid flow from said inlet through each of said seats into said chamber while said disc remains subjected to equal pressures.

5. A balanced valve comprising a valve body defining an inner chamber, an outer chamber substantially enveloping said inner chamber, an inlet opening into one of said chambers, an outlet opening into the other of said chambers, means defining a pair of substantially equal diameter coaxial conduits through opposed walls of said inner chamber, one of said conduit defining means being fixed and the other mounted for axial movement toward and from the fixed one of said conduit defining means, an elastomeric disc having a cross section greater than the internal cross section of said conduits and mounted for coaxial floating movement between the adjacent ends of said conduits, and means operable to move said movable conduit defining means toward said fixed conduit defining means to compress said disc between the adjacent ends of said conduit defining means and thereby preclude fluid flow between said chambers and for movement away from said fixed conduit defining means to permit fluid flow between said chambers through both of said conduit defining means, said disc being subjected to substantially equal fluid pressures on both sides in both its open and closed positions.

6. In a valve operating mechanism controlled by fluid pressure:
 (a) a flexible diaphragm,
 (b) a valve stem connected to and movable with said diaphragm,
 (c) a valve on said valve stem,
 (d) a valve seat cooperating with said valve and limiting movement of said valve and said diaphragm in one direction,
 (e) and a floating resilient sealing gasket slidably mounted on said valve stem between said valve and said valve seat and operable to be clamped between said valve and said seat when said valve is closed.

7. A valve operating mechanism controlled by fluid pressure comprising:
 (a) a flexible diaphragm,
 (b) first means secured to and movable with said diaphragm in response to changes in fluid pressure on said diaphragm,
 (c) a valve stem connected to and movable with said diaphragm,
 (d) a valve on said valve stem,
 (e) a valve seat cooperative with said valve and limiting movement of said valve and diaphragm in one direction,
 (f) a floating resilient sealing gasket slidably mounted on said valve stem between said valve and said valve seat and operable to be clamped between said valve and said seat when said valve is closed,
 (g) and stop means fixed with respect to said first means and engageable by said first means during its movement in an opposite direction to prevent overtravel of said diaphragm in the opposite direction.

8. A fluid control valve comprising:
 (a) means forming a hollow annulus providing a fluid inlet,
 (b) a valve seat on the discharge side of said annulus,
 (c) a valve stem centrally of said valve seat,
 (d) a valve on said stem cooperative with said seat to control the passage of fluid through said inlet,
 (e) and a floating resilient sealing gasket mounted between said valve and said valve seat and operable to be clamped between said valve and said seat when said valve is closed.

9. A fluid control valve comprising:
 (a) means forming a hollow annulus providing a fluid inlet,
 (b) a valve seat on the discharge side of said annulus,
 (c) a valve stem centrally of said valve seat,
 (d) a valve on said stem cooperative with said seat to control the passage of fluid through said inlet, (e) and a floating resilient sealing gasket slidably mounted on said valve stem between said valve and said valve seat and operable to be clamped between said valve and said seat when said valve is closed.

10. A fluid control valve comprising:
(a) a valve body having a central chamber and an outlet passageway connected thereto,
(b) means forming a hollow annulus providing a first fluid inlet to said chamber,
(c) a valve seat on the discharge side of said annulus,
(d) means forming a bore connected to said chamber and in alignment with said valve seat,
(e) a valve stem centrally of said valve seat,
(f) a tubular valve on said stem, slidable in said bore to provide a second fluid inlet to said chamber,
(g) said tubular valve being cooperative with said seat to control the passage of fluid through said first and second inlets to said chamber,
(h) and a floating resilient sealing gasket slidably mounted on said valve stem between said valve and said valve seat, operable to be clamped between said valve and said seat when said valve is closed and to float between said valve and said seat when said valve is open.

11. A valve operating mechanism actuated by fluid pressure comprising:
(a) a valve body having a cylindrical bore communicating with the interior thereof,
(b) a flexible diaphragm closing the outer end portion of said bore,
(c) a circular plate having a substantially leak tight fit within said bore and secured to said diaphragm for movement therewith,
(d) means forming a passageway through said plate to afford pressure communication between said diaphragm and the interior of said bore,
(e) and a stop ring secured to said valve body between said flexible diaphragm and said circular plate and protruding into said bore to stop movement of said circular plate in a direction outward and away from said circular bore to prevent overtravel of said diaphragm.

12. The valve operating mechanism described in claim 11 wherein:
(a) said means forming a passageway through said plate includes a check valve operable to close upon a surge of fluid pressure through said passageway toward said diaphragm, whereby said circular plate becomes a stand-by piston in the event of rupture of said diaphragm.

13. In a fluid pressure actuated pressure relief valve having a body formed with a passage, a resiliently biased flexible diaphragm mounted in said body and defining with said body an expansible fluid pressure chamber in fluid communication with said passage, said diaphragm having one side exposed to fluid pressure in said chamber, and valve means operatively connected to said diaphragm for controlling flow of fluid through said passage, the improvement comprising coacting stop means positioned on said body within said chamber and on the side of said diaphragm exposed to said chamber for limiting travel of said diaphragm in a direction that expands said chamber, said coacting stop means on said body comprising an annular plate clamped in engagement with said diaphragm between opposing parts of said body.

References Cited
UNITED STATES PATENTS

| | | | |
|---|---|---|---|
| 1,210,913 | 1/1917 | Dougherty et al. | 137—510 XR |
| 2,174,961 | 10/1939 | Bennett | 137—510 XR |

FOREIGN PATENTS

| | | |
|---|---|---|
| 124,259 | 7/1958 | Russia. |

M. CARY NELSON, *Primary Examiner.*

R. J. MILLER, *Assistant Examiner.*

UNITED STATES PATENT OFFICE
CERTIFICATE OF CORRECTION

Patent No. 3,392,751                                    July 16, 1968

Joseph A. Pommersheim et al.

It is certified that error appears in the above identified patent and that said Letters Patent are hereby corrected as shown below:

Column 8, lines 31 and 32, under "UNITED STATES PATENTS", cancel the references cited and insert the following references:

```
  510,635   12/1893   Duval --------------- 137-116.5
1,210,913    1/1917   Dougherty et al ----- 137-510 X
1,495,491    5/1924   Le Cain ------------- 137-494 X
2,174,961   10/1939   Bennett ------------- 137-510 X
2,216,296   10/1940   Raymond et al ------- 137-494
2,921,603    1/1960   Lofink -------------- 137-625.38
3,115,068   12/1963   Lofink --------------  91-414
```

Signed and sealed this 2nd day of December 1969.

(SEAL)
Attest:

EDWARD M. FLETCHER, JR.                        WILLIAM E. SCHUYLER, JR.
Attesting Officer                                   Commissioner of Patents